WILLIAM L. BRADLEY.
Improvement in Apparatus for Treating Animal Matters for Fertilizers.
No. 125,260. Patented April 2, 1872.
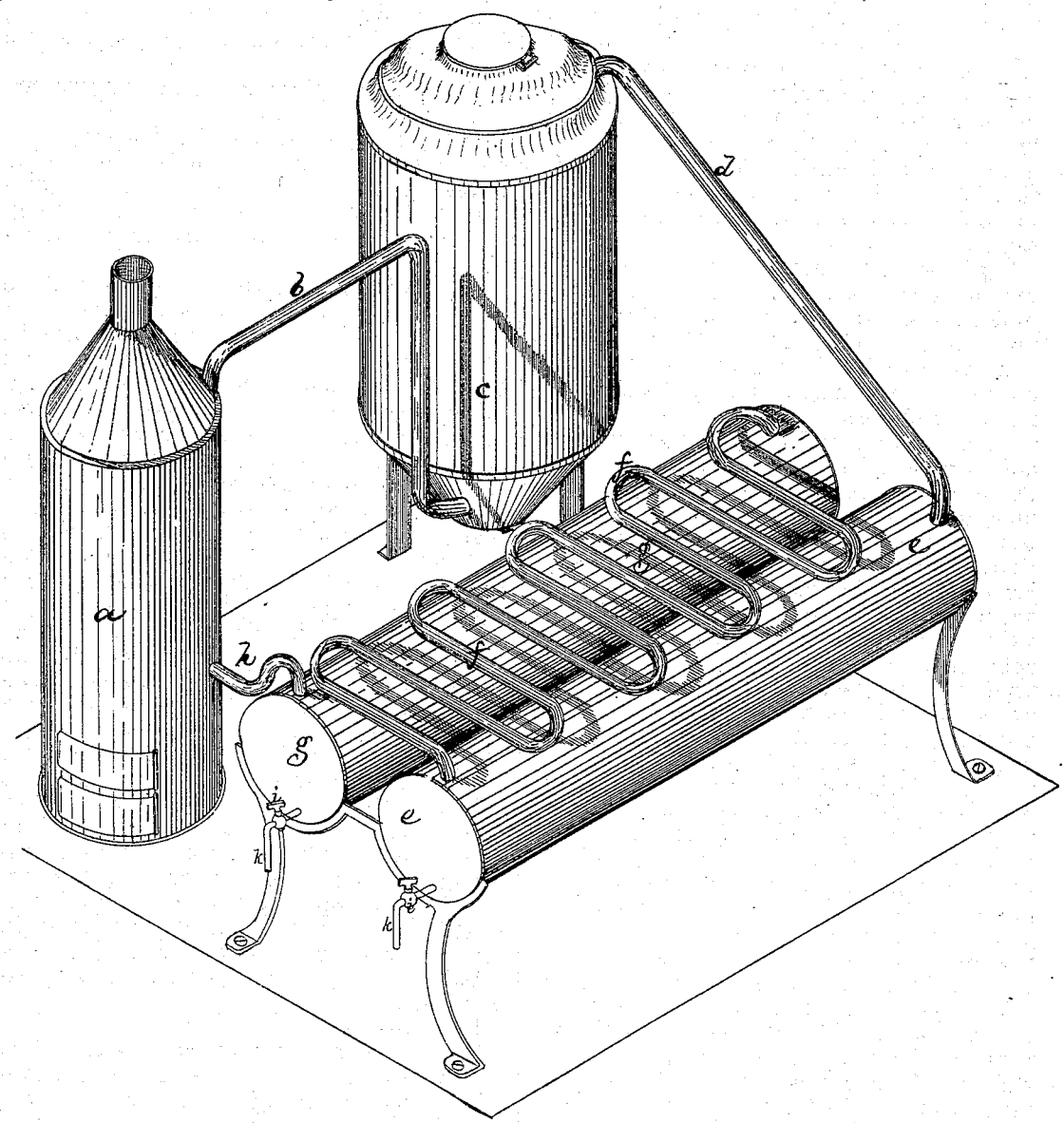

125,260

UNITED STATES PATENT OFFICE.

WILLIAM L. BRADLEY, OF BOSTON, MASSACHUSETTS.

IMPROVEMENT IN APPARATUS FOR TREATING ANIMAL MATTERS FOR FERTILIZERS.

Specification forming part of Letters Patent No. 125,260, dated April 2, 1872.

*To all whom it may concern:*

Be it known that I, WILLAM L. BRADLEY, of Boston, in the county of Suffolk and State of Massachusetts, have invented an Improvement in Treating Animal Matter, &c.; and I do hereby declare that the following, taken in connection with the drawing, which accompanies and forms part of this specification, is a description of my invention sufficient to enable those skilled in the art to practice it.

My invention relates to a method of treating bones or refuse animal-matter to reduce or dry the same; the invention having particular reference to the means of consuming the noxious and deleterious gases driven from the animal or other matters during the drying or rendering process.

In my invention I employ a steam-boiler and furnace and a tank for receiving the matter to be treated, dried, or reduced, a steam-pipe from the top of the boiler entering the bottom of the tank, either directly into the charged chamber, or into a steam-space or jacket surrounding said chamber, there being, opening from the top of this chamber, a pipe, which leads to one end of a long condenser-cylinder, from which cylinder a worm or tortuous pipe may lead to another condensing-cylinder, a tube leading from the top of the condenser-cylinder into the fire-pot of the furnaces; the gases and noxious vapors passing from the charged cylinder into the first condenser-cylinder, thence through said cylinder into the tortuous pipe, and through it into the second cylinder, and from it through the tube leading therefrom to the furnace, the gases and fumes passing into the fire-pot and being consumed therein. By the heated steam passing into or around the charged chamber the liquids in the refuse matters are driven off, carrying with them all noxious vapors and gases, and by the condensers the vapors thus driven from the charged chamber and into the condenser are more or less condensed, and settle to the bottom of the condenser, while the deleterious gases finally pass off into the furnace, where they are not only consumed, but form an element of fuel, being thus consumed without any chance for liberation into the atmosphere. From the bottom of the condenser-cylinders pipes may lead to subterranean drains, said pipes being provided with stop-cocks. When the liquid of condensation has sufficiently collected in the condensers the stop-cocks may be opened, letting the impure water or liquid into the drain.

The drawing represents an apparatus embodying my invention.

*a* denotes the furnace and boiler; *b*, the steam-pipe leading from the steam-chamber to the charging-tank *c*, and either directly into the charging-chamber or into the steam-jacket or steam-space surrounding said chamber.

By or with this steam the contents of the chamber are heated, causing the gases and vapors to rise therefrom and to pass into the tube *d*, through which said vapors and gases pass into the condenser-cylinder *e*. Through this cylinder the vapors and gases pass, and as they pass the vapors are more or less condensed, while those not condensed may pass from the cylinder into and through the tortuous condense-pipe or worm *f* into another condenser-cylinder, *g*, wherein all the vapors will become condensed. The gaseous products will pass from the condenser-cylinder into and through the pipe *h* to the fire-pot of the furnace, where they will all be consumed as fuel, while, whenever necessary, the cocks *i* may be opened and the water of condensation discharged through the pipes *k* into a drain or directly into tide-water.

By these means all noxious emanations, whether volatile or liquid, driven from refuse animal matters, bones, or other noxious matters treated by steam-heat to reduce or dry them, will be entirely consumed without entering or acting upon or tainting the surrounding atmosphere, thus enabling all such matters to be treated, dried, or reduced in the outskirts of cities, towns, or villages with-impairing the purity of the surrounding atmosphere.

I claim—

For treating refuse animal matters, &c., and in combination with the furnace and boiler, and the rendering or drying tank connected with and heated by the boiler, the condenser-cylinder or cylinders, having the pipes *h* leading therefrom into the fire-pot of the furnace, substantially as described.

WM. L. BRADLEY.

Witnesses:
FRANCIS GOULD,
S. B. KIDDER.